Jan. 19, 1932.    A. G. PETERKIN, JR., ET AL    1,841,846
WAX SWEATING
Filed April 17, 1930
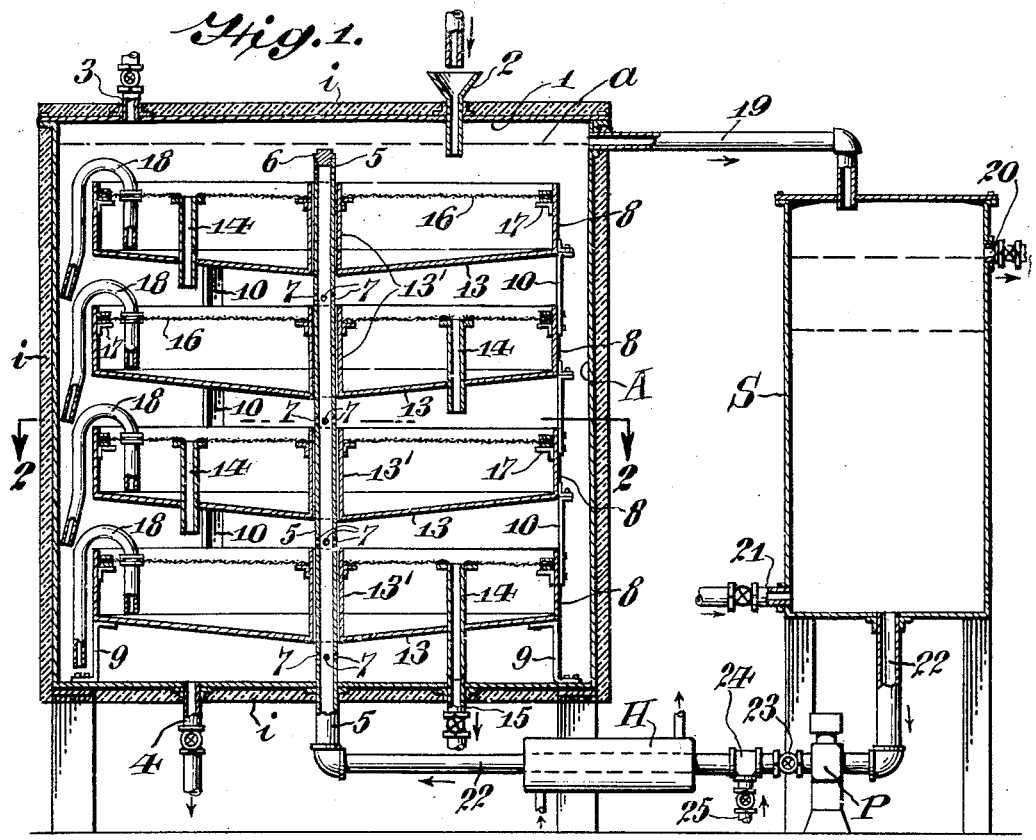
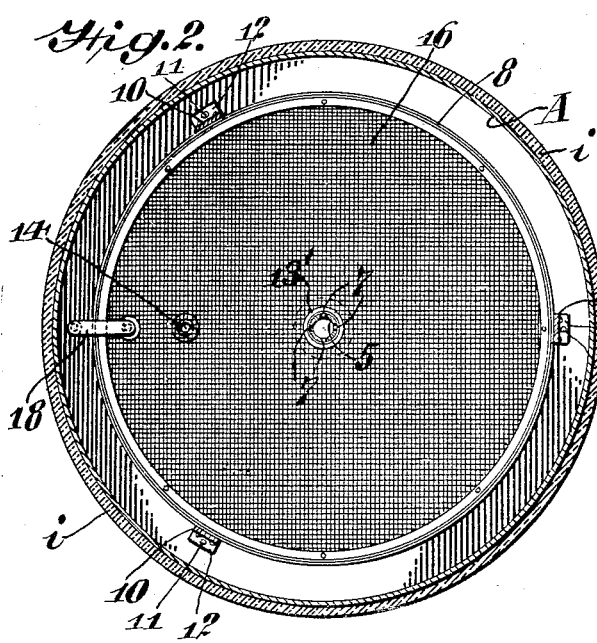
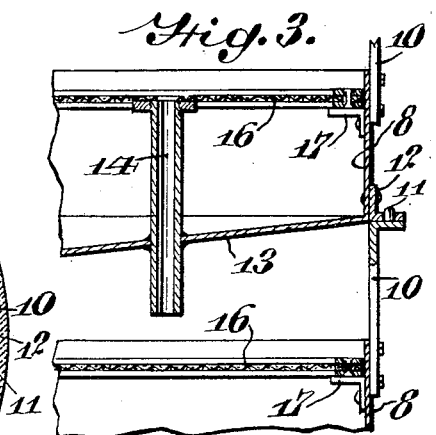
Inventors
Albert G. Peterkin Jr.
Lloyd B. Smith
By T. Wallace Quinn
Their Attorney Patented Jan. 19, 1932

1,841,846

UNITED STATES PATENT OFFICE

ALBERT G. PETERKIN, JR., OF BRYN MAWR, PENNSYLVANIA, AND LLOYD B. SMITH, OF MOORESTOWN, NEW JERSEY, ASSIGNORS TO THE ATLANTIC REFINING COMPANY, OF PHILADELPHIA, PENNSYLVANIA, A CORPORATION OF PENNSYLVANIA

WAX SWEATING

Application filed April 17, 1930. Serial No. 444,974.

The present invention relates to improvements in the art of sweating wax.

In the industry, the usual type of wax subjected to an initial sweating operation is that from which some oil has been removed, as by means of chilling and filter pressing, such wax ordinarily being referred to as slack wax. Waxes of this type contain varying percentages of materials liquid at temperatures considerably below the melting point of the final wax product usually produced therefrom, and sweating is resorted to to remove such materials at least in part or to substantial extent.

For a better understanding of our invention and to illustrate apparatus within its scope, reference is had to the accompanying drawings in which:

Fig. 1 is an elevational view, in section;

Fig. 2 is a plan view taken on line 2—2 of Fig. 1; and

Fig. 3 is an enlarged detail in section of parts of the apparatus, with portions broken away.

Referring to the drawings in which like reference characters designate corresponding parts in the several figures, A is a tank having a cover 1 provided with an inlet 2 and a valve controlled vent pipe 3. Both tank A and cover 1 may be suitably heat insulated as by means of heat insulating material $i$. The bottom of tank A is provided with a valve controlled outlet pipe 4, while pipe 5 passes through said bottom at approximately its center, and extends vertically upward to a level adjacent the top of the tank. Pipe 5 has a plug 6 in its upper end, while at various heights as indicated in the drawings, such pipe is provided with holes or apertures 7.

Within tank A, supported one above the other are pans or trays 8, the lowermost of which is supported an appropriate distance above the bottom of the tank by supporting members 9, each tray above it being supported by members 10 affixed to the tray next below, said members 10 having pins 11 which fit into holes in angle pieces 12 affixed to the tray being supported, as shown in detail in Fig. 3.

The bottoms 13 of the trays 8 extend downwardly toward the center, then emerge into upwardly extending walls 13′ which form tubular passages from the top through the bottom of each of the pans, through which the aforesaid pipe 5 extends. Each of the trays 8 is provided with a downflow pipe 14 which passes through the tray bottom, the upper end of each of said pipes determining the level to which the respective pans or trays are to be filled with wax as will be later set forth. Pipe 14 from the lowermost pan 8 joins with valve controlled line 15 which passes through and leads from the bottom of tank A.

Each of the trays 8 is provided with a screen 16 supported horizontally within the tray by small angle supports 17 affixed to the side walls of the trays, the height of the screen above the bottom of a tray being gauged by the length of pipe 14 within the tray, it being understood that each of the pipes 14, as well as screens 16, may be adjusted to suit particular requirements as to thickness of the solid cakes to be formed in the trays. Each tray also has a siphon 18, each tray screen supporting its particular tray siphon, the siphons serving as means for emptying the trays, as will be hereinafter described.

Leading from a point adjacent the top of tank A is a pipe 19, the outlet end of which communicates with the upper end of separator S, which separator is provided at a point adjacent its upper end with a valve controlled drawoff line 20, and at a point adjacent its bottom with a valve controlled pipe 21. Also with the bottom of the separator, there connects line 22 which leads to and from pump P, valve 23, T connection 24, to which is connected valve controlled inlet line 25, and through heat exchanger H to pipe 5 hereinbefore mentioned.

In carrying out our process in the above described apparatus, for example, using slack wax from a filter pressing operation, the slack wax is first completely liquefied by bringing it to a temperature, say of the order of 135 deg. F. The tank A, if necessary, having been previously heated to a temperature sufficiently high to prevent the wax from immediately solidifying, as for example, by blowing hot air or steam thereinto through line 5, and out through vent pipe 3, the liquefied wax is run into the uppermost pan 8 in the tank A through inlet 2. When the uppermost pan 8 becomes filled to the level determined by the uppermost end of its downflow pipe 14, the liquid passes through said pipe to the pan 8 next below, and so on until all of the pans are filled to the proper levels, which fact is indicated by passage of the liquid from the tank through line 15. Introduction is then stopped and the valve in line 15 is closed.

Cooling of the wax within tank A is then effected by passing air or other suitable gaseous cooling medium, the temperature of which may be carefully controlled, if necessary, as by means of heat exchanger H, into lines 22 and 5, through inlet 25, such cooling medium passing through the holes 7 in line 5, into tank A and serving to cool the material in the pans 8. Said cooling medium may be passed out of the system through vent pipe 3. When a layer of solid material thick enough to prevent flow forms on the exposed surfaces of wax within pans 8 as a result of such cooling, introduction of said medium may be suspended and an immiscible liquid, more dense than the liquid mixture or any of its components, and one in which the solubility of the solid and/or liquid material is inappreciable, as for example, water, is introduced through pipe 5 into tank A, such liquid either being introduced into the system through pipe 25, or being taken from the lower layer of liquid in separator S. The temperature of the liquid may be suitably regulated by means of heat exchanger H, circulation thereof being effected by means of pump P. Tank A is filled with the cooled liquid to the level indicated by the dotted line a, and as a result of the circulation and cooling effect of the liquid, the material in pans 8 is solidified, its temperature having been lowered, as for example, to about 80 deg. F. or less. Upon being maintained at this relatively low temperature, the material in pans 8 will begin to sweat and give up oil and/or lower melting wax or waxes, which because of its buoyance, will rise through screens 16, which now serve to hold the wax remaining as solid cakes in the several pans 8, said oil and/or lower melting wax passing to the level indicated by line a in tank A, thence with portions of the immiscible liquid through pipe 19 into separator S. In the separator, the oil and/or wax being of lower specific gravity than the immiscible liquid, and because of the reduction of velocity of flow in the separator, forms a top layer which may be continuously or intermittently withdrawn through line 20, while the immiscible liquid which forms a lower layer, may pass downwardly through line 22 and be recirculated through the system, or a part withdrawn from, or some added to the system through line 21, thereby to maintain the proper levels of liquids in separator S. The circulation of the immiscible liquid through tank A is continued, controlling its temperature in such a way or at such rates as are predetermined, until a substantially oil-free wax, or a wax of the desired melting point comes off through line 20, which indicates that the wax in tank A has been sweated to the proper or desired extent.

After the sweating operation has been completed, as indicated as last aforesaid, the temperature of the immiscible liquid being circulated, is raised sufficiently to cause the sweated material in the pans 8 to become liquid, whereupon it rises and passes with the immiscible liquid into the separator S, thence therefrom free from the immiscible liquid through line 20. The contents of the tank are then drawn off through line 4, the individual pans emptying themselves by means of siphons 18. The location of the siphons and the shape of the bottoms 13 of trays 8, permit a layer of immiscible liquid to remain sufficiently to cover such bottoms, it being advantageous to have liquid in contact with the wax surfaces, and to permit a cake of uniform thickness to form in the pans during the next succeeding run. Upon the completion of the operation, therefore, the apparatus is left ready for another charge.

What we claim is:

1. In combination, a closed tank, an open pan therein adapted to retain a body of liquid and held in spaced relation to the walls of said tank, means extending from outside said tank into the interior thereof for filling said tank with liquid, means for circulating a medium whose temperature is controlled, through said tank and over the surface of and in direct contact with liquid in said open pan to solidify liquid within said pan, and means associated with said pan which will permit passage of liquid thereinto, but which upon solidification of such liquid will retain the solid so formed within the pan.

2. In combination, a closed tank, an open pan therein adapted to retain a body of liquid and held in spaced relation to the walls of said tank, means extending from outside said tank into the interior thereof for filling said pan with liquid, means for circulating a medium whose temperature is controlled, through said tank and over the surface of and in direct contact with liquid in said open pan to solidify liquid within said pan, and a screen supported within said pan for retaining solid therein.

3. In combination a closed tank, an open pan therein adapted to retain a body of liquid and held in spaced relation to the walls of said tank, means extending from outside said tank into the interior thereof for filling said pan with liquid, means for passing a medium whose temperature is controlled into said tank and over the surface of and in direct contact with liquid in said open pan to solidify liquid within said pan, means associated with said pan which will permit passage of liquid thereinto but which upon solidification of the liquid will retain the solid within the pan, and means for passing the cooling medium out of said tank.

4. In combination, a closed tank, an open pan therein adapted to retain a body of liquid and held in spaced relation to the walls of said tank, means extending from outside said tank into the interior thereof for filling said pan with liquid, means for circulating a medium whose temperature is controlled into said tank and over the surface of and in direct contact with liquid in said open pan to solidify liquid within said pan, a screen supported within said pan for retaining solid therein, and means for passing the cooling medium out of said tank.

5. In combination, a closed tank, an open pan supported therein, said pan having a conical-shaped bottom, means extending from outside said tank into the interior thereof for filling said pan with liquid, means for passing a medium whose temperature is controlled, into said tank to solidify liquid within said pan, and means associated with said pan which will permit passage of liquid thereinto but which upon solidification of the liquid will retain the solid within the pan.

6. In combination, a closed tank, an open pan therein adapted to retain a body of liquid and held in spaced relation to the walls of said tank, means extending from outside said tank into the interior thereof for filling said pan with liquid, means extending from the exterior of said tank substantially vertically upwardly into its interior, said last mentioned means being provided with a plurality of outlets for distributing a medium whose temperature is controlled, throughout said tank and into contact with the exposed surface of material within said pan, whereby the temperature of material within the pan may be regulated.

7. In combination, a closed tank, an open pan within said tank, said pan having a cone-shaped bottom which emerges into upwardly extending side walls which form a tubular passage centrally of the pan from the top through the bottom thereof, means extending from outside said tank into the interior thereof for filling said pan with liquid, and means extending from the exterior of said tank substantially vertically upwardly into its interior and through the aforesaid tubular passage in said pan, said last mentioned means being provided with a plurality of outlets through which a medium whose temperature is controlled, may be distributed throughout said tank.

8. In combination, a closed tank, a pan within said tank, means extending from outside said tank into the interior thereof for filling said pan with liquid, means for removing liquid from the lower part of said tank, said pan having a siphon having one end communicating with a point adjacent the pan bottom, extending outside of said pan and terminating at a point below said bottom for permitting liquid to flow from said pan into said tank.

9. In combination, a closed tank, an open pan therein adapted to retain a body of liquid and held in spaced relation to the walls of said tank, means extending from outside said tank into the interior thereof for filling said pan with liquid, means for circulating a medium whose temperature is controlled, through said tank and over the surface of and in direct contact with liquid in said open pan to solidify liquid within said pan, means associated with said pan which will permit passage of liquid thereinto but which upon solidification of such liquid will retain the solid within the pan, and means for emptying liquid from said pan into said tank.

10. In combination, a closed tank, a plurality of open pans supported therein in spaced relation to each other and to the walls of the tank, each of said pans adapted to retain a body of liquid, means for delivering liquid to said pans, means for circulating a medium whose temperature is controlled through said tank and over the surface of and in direct contact with liquid in the open pans to solidify liquid within said pans, and means associated with at least one of said pans which will permit passage of liquid thereinto and therefrom but which will retain solids within such pans.

11. In combination, a closed tank, a plurality of open pans within said tank spaced from and supported one above the other, means for delivering liquid into the uppermost of said pans, a downflow pipe associated with each of said pans which determines the level to which the respective pans may be filled with liquid, means communicating with the downflow pipe of the lowermost pan for conducting liquid from such pan and the tank, means for circulating a medium whose temperature is controlled, through said tank to solidify liquid within said pans, and means associated with at least one of said pans which will permit passage of liquid thereinto but which upon solidification of such liquid will retain the solid so formed within the pan.

12. In combination, a closed tank, an open pan supported within and spaced from the walls of said tank, adapted to retain a body of liquid, a screen across the open side of said pan, means for circulating a medium whose temperature is controlled into direct contact with liquid in said pan, and out of said tank, and means for controlling the temperature of the cooling medium before it is introduced into said tank.

13. In combination, a closed tank, an open pan supported within and spaced from the walls of said tank, adapted to retain a body of liquid, a screen across the open side of said pan, means for recirculating a medium whose temperature is controlled into direct contact with liquid in said pan, and out of said tank, and a heat exchanger and separator interposed in said means.

14. In combination, a closed tank, at least two open pans supported within said tank, one above the other in spaced relation one to the other and to the walls of the tank, means associated with the tank through which a liquid may be introduced into the uppermost of said pans, a downflow pipe associated with each of said pans which determines the level to which each of the pans may be filled with liquid, means for circulating a cooling medium into and through said tank so that liquid within said pans may be solidified, means for introducing a heating medium into said tank, means for conducting the cooling medium from said tank, a second tank, means for conducting the heating medium from the first tank to the second tank, means leading from said second tank through which fluid may be passed therefrom into the first tank, and means associated with said last mentioned means for adjusting the temperature of said fluid.

15. In combination, a closed tank, a plurality of open pans therein, spaced from each other and from the walls of the tank, means for introducing above at least one of said pans a medium whose temperature is controlled, a second tank, means interposed between said closed tank and said second tank, whereby a heterogeneous liquid may be conducted from the former to the latter, said tank adapted to permit continuous separation of the heterogeneous liquid into component liquids, and means connected with said second tank and the tank first mentioned whereby one of said component liquids separated in the second tank may be returned to the first tank.

16. The process for sweating wax which comprises the following sequence of steps, first heating the wax to a temperature sufficiently high to cause it to liquefy, then causing it to form a pool, cooling it sufficiently to cause exposed surfaces thereof to solidify, passing an immiscible liquid the temperature of which is controlled, into direct contact with liquid in said pan, contact therewith, thereby to cause substantially complete solidification of the wax, and maintaining the pool of wax while in contact with the immiscible liquid at temperatures sufficient to cause the wax to sweat, thereby to separate liquid from the wax.

17. The process for sweating wax which comprises heating the wax to a temperature sufficiently high to cause it to liquefy, then forming the liquid into a pool, cooling the liquid sufficiently to cause the exposed surface thereof to solidify, thereafter passing an immiscible liquid, the temperature of which is controlled, into contact with the exposed surface of solid, thereby to cause solidification of substantially the entire pool of liquid, maintaining the solid so formed while in contact with the immiscible liquid at temperatures sufficient to cause the solid to sweat, conducting the liquid formed as a result of sweating from the solid, thereafter conducting such liquid along with portions of the immiscible liquid into a separate zone, continuously separating the liquid formed as a result of sweating from the immiscible liquid, and continuously returning the immiscible liquid back into contact with the solid aforesaid.

18. The process for sweating wax which comprises heating the wax to a temperature sufficiently high to cause it to liquefy, then forming the liquid wax into at least one pool, cooling the liquid wax sufficiently to cause the exposed surface thereof to solidify, passing an immiscible liquid the temperature of which is controlled, in continuous circuit over the solidified surface of the wax and into contact therewith, thereby to cause solidification of substantially all of the wax, then increasing the temperature of the wax while in contact with the immiscible liquid, thereby to cause the wax to sweat and liquid to exude therefrom, conducting such liquid with portions of the immiscible liquid out of contact with the wax, gradually increasing the temperature of the immiscible liquid, thereby to effect separation from the wax of liquids which when solidified are of increasingly higher melting points, continuously separating the immiscible liquid from the liquid formed as a result of sweating, collecting the latter into fractions of increasing melting points, adjusting the temperature of the immiscible liquid, and returning the immiscible liquid into contact with the wax being sweated.

In testimony whereof we affix our signatures.

ALBERT G. PETERKIN, Jr.
LLOYD B. SMITH.